3,317,332
COMMINUTION OF GLASS
William A. Pliskin, Poughkeepsie, N.Y., assignor to International Business Machines Corporation, New York, N.Y., a corporation of New York
No Drawing. Filed June 9, 1964, Ser. No. 373,828
4 Claims. (Cl. 106—308)

This invention relates to improved glass particles, and, in particular, to the comminution of glass of the type used in the passivation of solid state devices.

To protect solid state devices, such as transistors, diodes, resistors, capacitors, semiconductors and the like, from corrosion and contamination, glass films are deposited about the device. These glass films provide a tightly adherent protective jacket on the device which serves as a hermetic seal and passivates the device against surface attack from vapors and impurities. The electrical characteristics of a solid state device lacking such a jacket are susceptible to degradation, which adversely affects the circuit reliability, a most serious problem, particularly in a solid state micro-electronic circuit.

A variety of techniques are available for applying these glass films to a solid state device. These techniques include spraying, silk screening, and sedimentation. What is required in such a method is that it yield a controlled, uniform, and defect-free glass film. U.S. Patent No. 3,212,921 to Pliskin et al., assigned to the assignee of the instant application, provides such a process.

That process employs sedimentation, centrifuging and firing steps to produce a pinhole-free, uniform, thin glass film of less than 0.5 microinch in thickness. Colloidal suspensions of glass particles, having a particle size less than 0.7 micron in diameter, and preferably less than 0.2 micron, are centrifuged about the device at about 2000 G's or so for 2 or 3 minutes to deposit the colloidal particles on the device. Following decantation of the excess liquid, the device is fired to form a compact, uniform, defect-free passivating coating on the device.

Although the process is satisfactory for forming the passivating coatings, difficulties have been encountered in preparing the necessary glass particles for the suspension. Good yields are not easily attained with the glass particles because surface functional groups of some particles are such that the electric double layer formed in the suspending media does not give rise to a stable suspension. The glass particles have a tendency to agglomerate in the suspension, and, when the glass agglomerates, fairly large cakes form in the suspension and deposit on the device to form a rough surface, which lacks uniformity and the required passivating characteristics. As brought out in the heretofore mentioned U.S. patent application of Pliskin et al., these difficulties are presently successfully circumvented by control of the dielectric constant, the viscosity and volatility of the suspended media and selection of the particle size of the glass material.

It has been found that in grinding the glass particles to the required particle size, that is, to a size less than 0.7 micron and preferably less than 0.2 micron, for use in the suspending media, that the use of selected additives, during this grinding operation, provides the glass particles with the required suspending characteristics. By this grinding operation, the number of glass particles useful for making a stable suspension is increased due to the more favorable double layer characteristics which result, when the properly ground glass particles are placed in the suspending media.

Accordingly it is a primary object of this invention to provide an improved process for grinding glass particles for use in glass films for passivating solid state devices.

It is a further object of this invention to provide a glass particle which is readily dispersible in a suspending media.

It is still a further object of this invention to provide a commercially feasible grinding process furnishing increased yields of glass particles for passivating solid state semiconductor devices.

The foregoing and other objects, features and advantages of the invention will be apparent from the following more particular description of the preferred embodiments of the invention.

In accordance with the present invention, these objects are accomplished by incorporating into the grind of glass particles, in the grinding operation, a relatively small percentage of a compound, the percentage being based on the weight of the glass particles, where the compound has a general formula selected from the group consisting of:

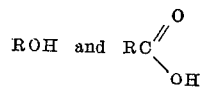

where R includes carbon and hydrogen in the relationship as shown by the formula:

where $n$ is a whole number between 1 and 3.

The preferred compounds for employment as these additives are selected from the group consisting of methyl, ethyl, propyl and isopropyl alcohol, and, acetic acid. With the incorporation of between 0.1 to 0.6 percent by weight of these additives to the grind, the number of glass particles, having a size less than 0.7 micron, which are dispersible in the suspending media, is increased and the resulting properties of the thin film glass passivating film further enhanced.

Of course it will be recognized that it is known in the art to employ additives in a grinding operation, however, it has been found that the number of glass particles dispersible in the media, such as organic fluids having a dielectric constant in the range between 3.4 to 20.7, and of the type required for centrifuging a passivating film onto a solid state device, is limited, unless the additives of the present invention are utilized. Further, it has been found, it is important to maintain the additions within 0.1 to 0.6 percent, and, preferably in the range between 0.2 to 0.5 percent, in order to realize the advantages and benefits of their incorporation. The efficiency, as grinding aids, of these additives is hereafter illustrated by the data presented and the discussion to follow.

In grinding glass particles of the designated size with the additives of the present invention, the additives react with the glass to form a surface structure on a glass having methyl groups. This produces more stable glass suspensions in the suspending media and facilitates the formation of high quality passivating glass film. This, it is believed, is due to the differences in the adsorption species formed in the suspending media. With the alkoxy type surfaces, that is, the glass surface structure with the alkyl groups, the electric double bond layers formed by the adsorptive species gives rise to a much more stable suspension than that formed without an additive or with other additives. Further, it has been found that the population density of the surface alkyl groups is critical, which, it is believed, is due to the electric double layer that is formed. Accordingly, it is important to maintain the proportion of additives in the grind between 0.1 to 0.6 percent, and, preferably, between 0.2 to 0.5 percent of the grind.

Now, more specifically as to the grinding operation, glass particles having a size in the order of ⅛ to ¼ of an inch are cleaned in a solvent, washed in water, and dried. Examples of the various glasses which may be used to furnish the particles are given in Table I below. It should be recognized that these are given by way of illustration and not intended limitations, since a wide variety of glass particles are treatable in this fashion to increase their dispersing ability.

TABLE I

| Glass | (Wt. Percent) Constituents | Density, g./cc. | Softening Point, ° C. | Coefficient of Expansion per ° C. (×10⁻⁷) |
|---|---|---|---|---|
| A | 81% $SiO_2$<br>12.1% $B_2O_3$<br>3.8% $Na_2O$<br>0.4% $K_2O$<br>2.2% $Al_2O_3$<br>0.5% $As_2O_3$ | 2.2 | 820 | 33 |
| B | 83.5% $SiO_2$<br>4.5% $Al_2O_3$<br>12.0% $B_2O_3$ | 2.2 | 1,150 | 14 |
| C | 50% $SiO_2$<br>30% PbO<br>12% $B_2O_3$<br>7.5% $Al_2O_3$<br>0.5% $As_2O_3$ | 2.9 | 783 | 37 |
| D | 65% $SiO_2$<br>24% $Al_2O_3$<br>11% CaO | 2.5 | 1,060 | 35 |

In Table I, the first column gives the sample type; the second column gives the glass constituents in weight percent; the third column gives the density of the glass in grams per cubic centimeter; the fourth column is the softening point of the glass; and the fifth column is the coefficient of expansion per degree centigrade of the glass.

In grinding the glass particles, a high alumina grinding jar mill of about 5¼" in diameter and 5⅛" in height and having a capacity of 0.4 gallon is taken and half-filled with a grinding media. The preferred media is a non-metallic ultra high fired alumina ceramic having a 13/16" outer diameter and a 13/16" height, a hardness of 9 on the Mohs' scale and a specific gravity of 3.65. About 300 grams of the ⅛" to ¼" glass particles are taken, combined with 0.1 to 0.6 percent of the additive, preferably 0.2 to 0.5 percent of the additive, and placed in the jar mill. The jar mill is then sealed, placed between rollers, and rotated at speeds between 75 to 300 r.p.m., and, preferably at a speed of about 100 r.p.m., for a period between 12 to 36 hours. In most instances, 24 hours is sufficient to give glass particles with a particle size of less than 40 microns.

The glass particles of the size less than 40 microns are taken and placed in a suspending media to separate, by centrifuging techniques, the particles of less than 0.70 micron from the larger particles. In doing this, about 10 to 50 grams of glass powder are combined with a dielectric solution which constitutes 15% isopropyl alcohol and 85% ethyl acetate. The suspension is then centrifuged for a period between 5 to 15 minutes, at speeds varying from 200 to 500 G's, to centrifuge out the undesirable larger particles. Following the centrifuging treatment, the remaining suspension, containing the desired fine particles, is then decanted. Prior to being used as a passivating coating, the glass concentration is diluted with the proper amount of suspending liquid to obtain the desired passivating film thickness. For example, with a glass such as type C, a suspension is ultrasonically mixed containing 25 grams of the glass powder, 33 cubic centimeters of isopropyl alcohol, and 187 cubic centimeters of ethyl acetate. The suspension is then centrifuged for 10 minutes at 360 G's. The suspension is then decanted to retrieve the fine particles. Since it is preferable to use particles having a size less than 0.5 micron, and, most desirable to use particles having a size of less than 0.1 to 0.2 micron, it may be necessary to vary the centrifuging times and speeds to obtain the required particle size.

The glass particles resulting from the grinding and centrifuging treatment are then ready for use in the centrifuging passivating technique as described in the heretofore mentioned U.S. patent of Pliskin et al. The use of the additives within the proportions as heretofore indicated provides an increased number of glass particles which are dispersible in the centrifuging suspending media, and, which yield an improved glass passivating film. In Table II below, examples are given of the various additives and the required proportions for obtaining a dispersible glass particle. These examples are given by way of illustration and not intended limitations.

TABLE II

| Glass Type | Glass Amt. in gms. | Additive Type | Additive Amt. in cc. | Additive, wt. percent | Yield Increase in percent |
|---|---|---|---|---|---|
| C | 300 | Methyl alcohol | 0.8 | 0.21 | 90 |
| C | 300 | Ethyl alcohol | 1 | 0.24 | 60 |
| C | 300 | Propyl alcohol | 0.7 | 0.20 | 85 |
| C | 300 | Methyl alcohol | 0.5 | 0.13 | 10 |
| A | 300 | Methyl alcohol | 0.7 | 0.18 | 120 |
| A | 300 | Isopropyl alcohol | 0.7 | 0.18 | 90 |
| C | 300 | Methyl alcohol | 0.9 | 0.24 | 60 |
| B | 200 | Methyl alcohol | 0.7 | 0.18 | 200 |
| D | 300 | Acetic acid | 0.7 | 0.24 | 740 |
| C | 300 | Methyl alcohol | 0.75 | 0.20 | 70 |
| C | 300 | Methyl alcohol | 1.16 | 0.31 | 10 |

In the table, the first column gives the glass type; the second column, the amount of glass, in grams, added to the high alumina grinding jar; the third column, the type additives added to the high alumina grinding jar; the fourth column, the amount of grinding additives in cubic centimeters; the fifth column, the amount of grinding additives added in weight percent; and the sixth column gives the increase in yield, obtained with the grinding additive, as compared to the use of water as a grinding additive.

Grinding with additives, other than those indicated, or outside of the proportions designated, does not yield the results given above. For example, grinding additives such as alcohol ethers, higher alcohols, glycols, substituted glycerols, and phenols, do not yield results significantly different than those given for water above. Accordingly, to achieve the advantages of the invention, it is necessary to employ additives selected from the group consisting of alcohols and organic acids, within the proportions heretofore defined.

What has been described is a procedure for obtaining dispersible glass particles which have many desirable properties for use in a glass passivating film for solid state devices. The glass particles have a particle size of less than 0.7 micron and are made dispersible by the placing of alkyl or alkoxy groups on the surface of the particle. This produces glass particles with partially alkylated surfaces. Such a surface may be represented chemically by the graphical formulation:

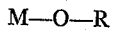

or

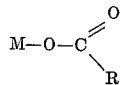

where M is a metal such as silicon and where R is an alkyl group represented by the formula:

where $n$ is a whole number between 1 and 3.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In the process of comminuting glass to form dispersible glass particles of less than 40 microns average diameter, the step of combining with the glass in the comminuting apparatus from 0.1 to 0.6 percent by weight of a compound selected from the group consisting of:

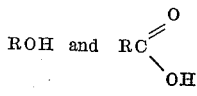

where R includes carbon, hydrogen in the relationship as shown by the formula:

where $n$ is the whole number between 1 and 3, inclusive.

2. In the process of comminuting glass to form dispersible glass particles of less than 40 microns average diameter, the step of combining with the glass in the comminuting apparatus from 0.2 to 0.5 percent by weight of a compound selected from the group consisting of:

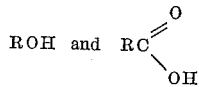

where R includes carbon, hydrogen in the relationship as shown by the formula:

where $n$ is the whole number between 1 and 3 inclusive.

3. In the process of comminuting glass to form dispersible glass particles, the steps of: adding to said glass from 0.1 to 0.6 percent by weight of a compound selected from the group consisting of methyl alcohol, ethyl alcohol, propyl alcohol, isopropyl alcohol, and acetic acid, and grinding said additive with said glass to form glass particles of less than 40 microns average diameter with partially alkylated surfaces.

4. In the process of comminuting glass to form dispersible glass particles, the steps of: adding to said glass from 0.2 to 0.5 percent by weight of a compound selected from the group consisting of methyl alcohol, ethyl alcohol, propyl alcohol, isopropyl alcohol, and acetic acid, and grinding said additive with said glass to form glass particles of less than 40 microns average diameter with partially alkylated surfaces.

References Cited by the Examiner

UNITED STATES PATENTS 2,657,149   10/1953   Iler _____ 106—308

TOBIAS E. LEVOW, *Primary Examiner.*

HELEN M. McCARTHY, *Examiner.*

J. E. POER, *Assistant Examiner.*